May 1, 1928.  
F. S. RICH  
1,668,249  
AUTOMOBILE RIDING AMUSEMENT DEVICE  
Filed Dec. 13, 1926  
4 Sheets-Sheet 2

Inventor:  
F. S. Rich.  
by Hazard and Miller  
Attorneys

May 1, 1928.
F. S. RICH
1,668,249
AUTOMOBILE RIDING AMUSEMENT DEVICE
Filed Dec. 13, 1926
4 Sheets-Sheet 3
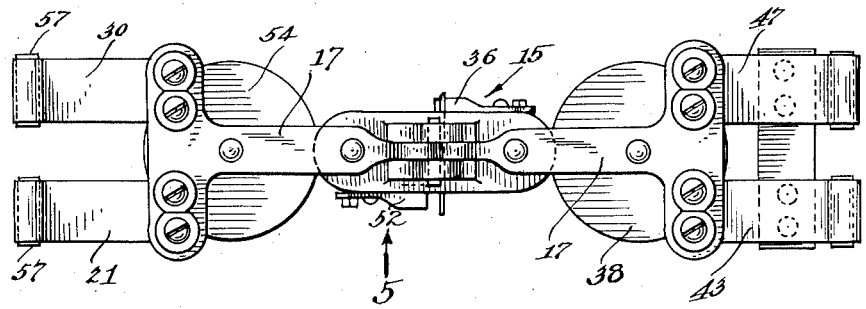
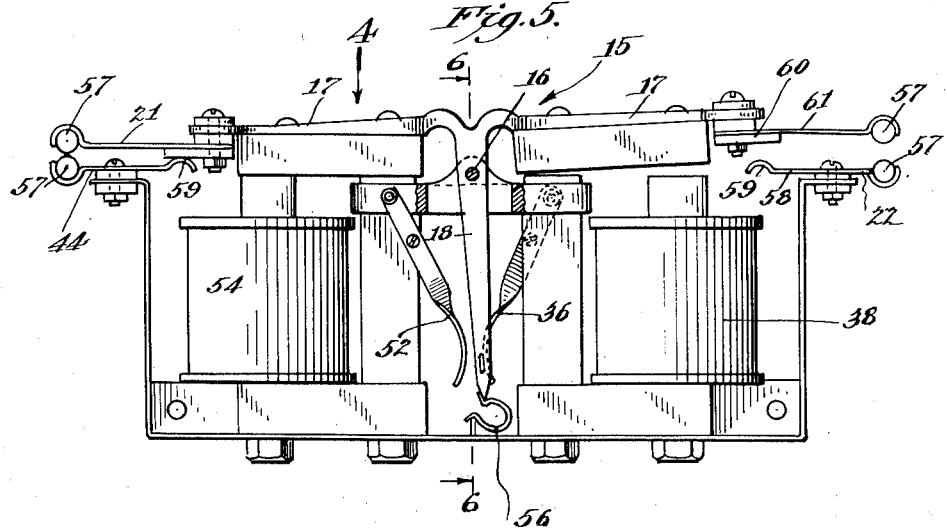
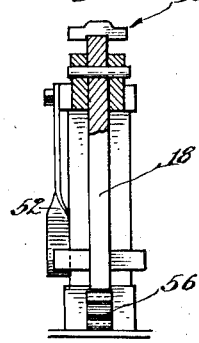
Inventor:
F. S. Rich.
by Hazard and Miller
Attorneys May 1, 1928.
F. S. RICH
1,668,249
AUTOMOBILE RIDING AMUSEMENT DEVICE
Filed Dec. 13, 1926   4 Sheets-Sheet 4
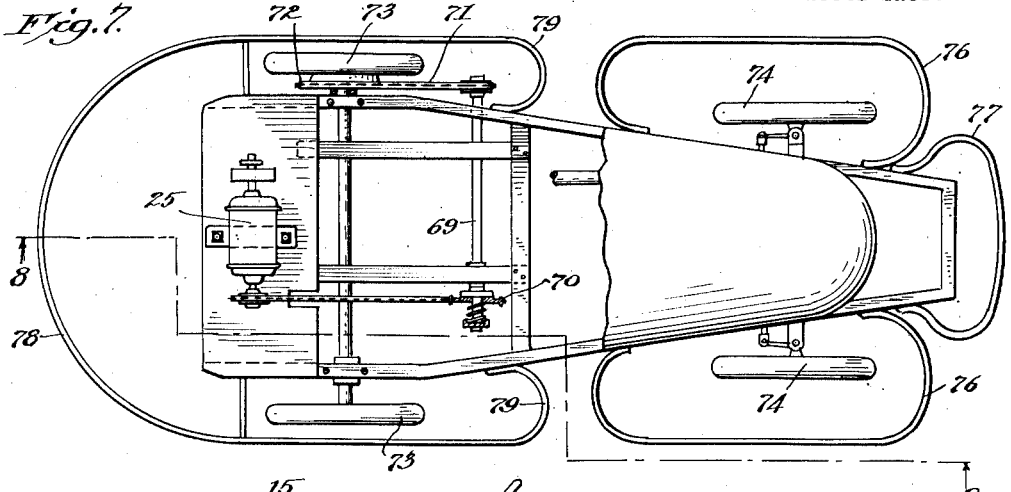
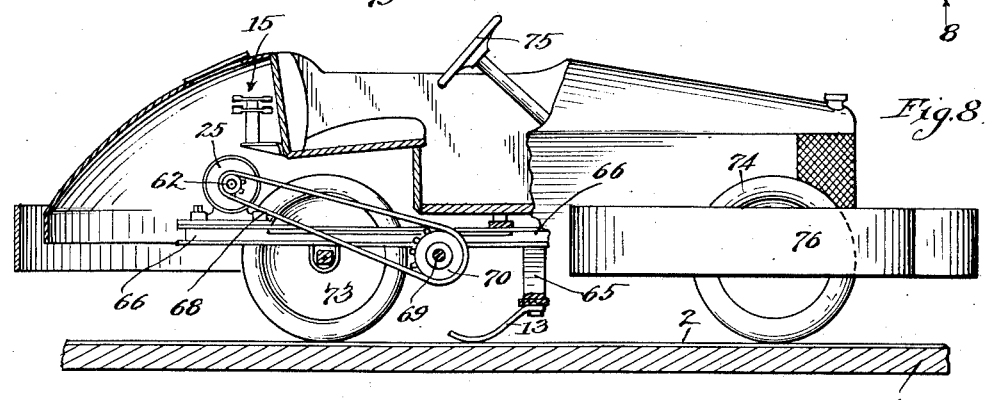
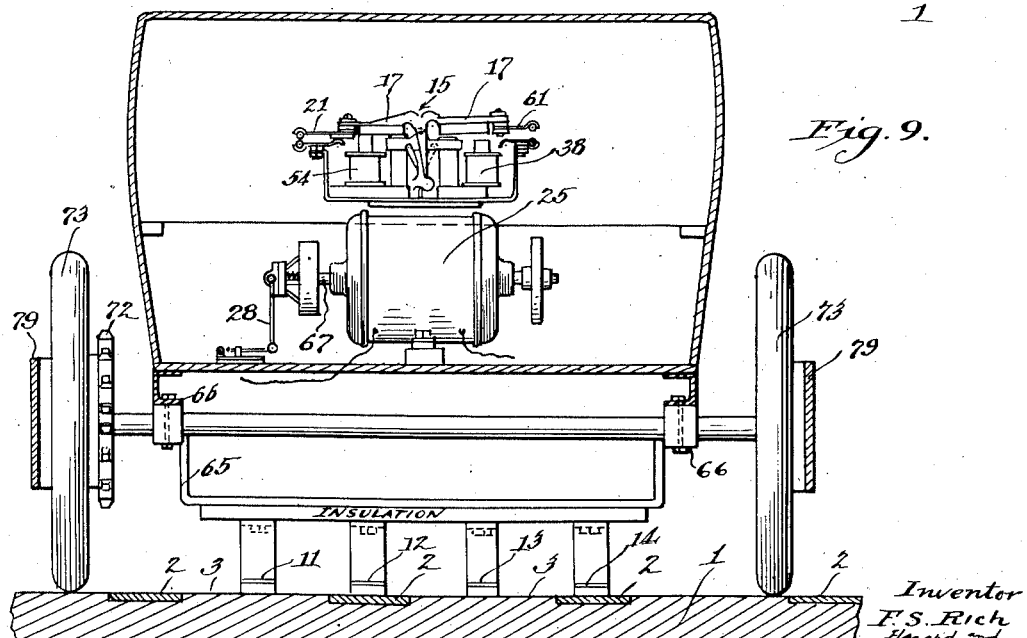
Inventor
F. S. Rich
by Hazard and Miller
Attorneys Patented May 1, 1928.

1,668,249

UNITED STATES PATENT OFFICE.

FRANK S. RICH, OF LOS ANGELES, CALIFORNIA, ASSIGNOR OF ONE-HALF TO WILLIAM WELCH COCKINS AND ONE-HALF TO FRANK L. STINEMAN, BOTH OF SANTA MONICA, CALIFORNIA.

AUTOMOBILE RIDING AMUSEMENT DEVICE.

Application filed December 13, 1926. Serial No. 154,489.

My invention is an automobile riding device intended for amusement parks or the like, in which a series of electric propelled automobiles may circulate on a track, the steering of the automobiles being controlled by the driver, but the driver having no control over the power for operating the machine except that he may run from one set of conductors onto another set.

An object of my invention is the construction of an automobile riding amusement device having a track with a series of pairs of conductors giving a feed and return circuit to operate electrically driven automobiles, the conductors being spaced apart transversely of the track. The automobiles are provided with two pairs of contact shoes and are positioned relative to the conductors so that when travelling in alignment with the conductors there will be a pair of shoes in contact with a pair of conductors of opposite polarity, thus giving a feed and return circuit to the automobile. The conductors are spaced preferably so that if an automobile is steered to run out of contact with one pair of conductors, it may possibly be spaced so that none of the contacts used will engage the conductors, or another pair of shoes engage another pair of conductors thus supplying current to drive the car. The conductors are arranged to allow sufficient angular travel of the cars to run from one side of the track to the other and thereby engaging different sets of conductors, but if the car is turned at too sharp an angle the shoes will lose contact and therefore they will come to rest.

Another object of my invention is the construction of a track system with feeders to the conductors so that the voltage of different pairs of conductors may be changed, thereby giving different speeds to the automobiles when they are in different portions of the track transversely of same. This adds to the amusement feature as the driver strives to find the position on the track which will give him the greatest speed.

One of the specific objects of my invention is the construction of an automobile switching device so that when the contact shoes engage the conductors of different polarity, the switch will be operated to convey the current from such shoes to the electric motor.

Another detailed object of my invention is the construction of an electrically driven automobile having contact shoes with an electric motor having the switching arrangement and a centrifugal or other governor to switch off the motor if its speed becomes too great. The cars are equipped with bumpers on the sides, front and back, so that they may collide one with the other without doing any damage.

A further object of my invention is devising a system of conductors and control therefor, together with suitable vehicles, and means of operating same so that low voltages may be utilized permitting the attendants and travelers if necessary to walk upon the track and step on the conductors.

My invention in its various aspects will be more readily understood from the following description and drawings, in which:

Figure 2 is a cross section on the line 2—2 of Fig. 1, taken in the direction of the arrows, illustrating the conductors embedded in the track and the manner in which a circuit is established to the automobile.

Figure 3 is a wiring diagram showing the conductors, contact shoes, the reversal switch, the electromagnets for reversing same, and the circuits controlling the motor.

Figure 4 is a plan view of the switch installation as if taken in the direction of the arrow 4 of Fig. 5.

Figure 5 is a side elevation of the switch as if taken in the direction of the arrow 5 of Fig. 4.

Figure 6 is a vertical section on the line 6—6 of Fig. 5 taken in the direction of the arrows.

Figure 7 is a plan view, partly broken away, of an automobile suitable for use in an amusement place.

Figure 8 is a longitudinal section of Fig. 7 on the line 8—8, being partly in section and partly side elevation.

Figure 9 is a rear view of the automobile with the body structure broken away to show the mounting of the motor, the control switch, the shoes and the operating wheels.

Figure 1:
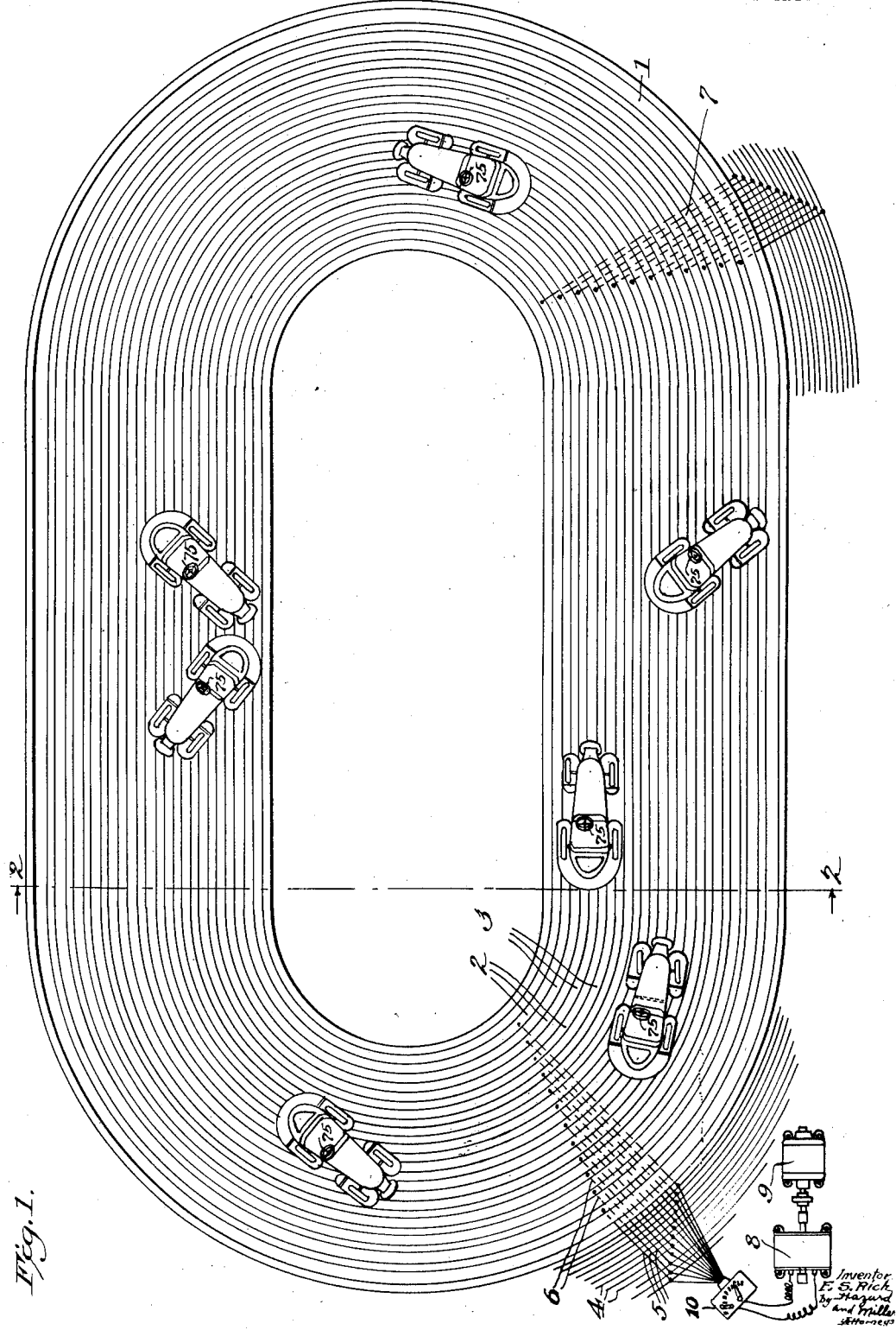
Figure 1 is a plan view of the track illustrating a number of automobiles thereon and showing diagrammatically the feed system for the conductors embedded in the track, and means for changing the voltage of different conductors.

Reference is first directed to the construction of the track, the installation of the conductors and the power supply, as illustrated particularly in Figs. 1 and 2. The track is designated generally by the numeral 1 and may be of any suitable size for an amusement park or the like. The track has a series of conductors 2 embedded in the track, leaving non-conducting spaces 3. The adjacent conductors are of different polarity for a purpose hereunder set forth. The track may be made of any suitable shape and is shown in the drawings as being somewhat oblong with rounded ends.

A series of feed wires 4 extend around the track and there are leads 5 from the feed wires to the conductors, these lead wires being led from the feed wires to the conductors at different spaces around the track, as indicated by the numerals 6 and 7. The power may be supplied by any suitable device and is illustrated herein as having a direct current generator 8 which may be operated by a suitable motor 9, the generator giving current of a comparatively low voltage, which I find a maximum of 32 volts satisfactory.

A control 10 of any suitable character, and illustrated as being regulated by an attendant, may be utilized to change the voltage in the different feed wires and hence in the different conductors so that there will be a variation in current supplied to these different conductors so that the automobiles in certain divisions on the track will travel faster than those in another division. It is to be understood that this control of the voltage may be mechanically operated if desired.

The wiring arrangement and reversal switch is constructed substantially as follows:

Having reference particularly to Fig. 3, a series of conductors 2 are, as above mentioned, alternatively positive and negative and are so indicated by the plus and minus signs in the diagram. The contact shoes 11, 12, 13 and 14, are suitably mounted on the vehicle as hereunder set forth. A walking beam type of switch is indicated generally by the numeral 15, the switch being mounted on a pivot 16, and having opposite arms 17, and a depending arm 18. Presuming the vehicle is in the position illustrated in Fig. 3 with the shoe 13 on the positive conductor, the current would be from such conductor through leads 19 and 20, a contact on the walking beam 21, a fixed contact 22, leads 23 and 24, to the motor 25. The lead circuit is by the leads 26 and 27 through a circuit breaker 28, hereunder described, a fixed contact 29, a movable contact 30, leads 31 and 32 to the shoe 11 on the negative conductor, thus the motor is energized and the vehicle driven.

Presuming the driver steers his vehicle so that it moves to the right carrying the contact shoes to the right, as shown in Fig. 3, then the shoe 12 will be in contact with the positive conductor which was engaged by the shoe 13 in the former case. The initial current passes through the leads 33 and 34, the contact 35 on the arm 18, the spring contact 36, the winding 37 on the electromagnet 38 having a core, leads 39 and 40 to the shoe 14 which will be in engagement with the negative conductor immediately to the right of such shoe.

The energizing of the electromagnet 38 swings the walking beam breaking the contacts 21, 22, 29 and 30. A current would then flow from the positive conductor through the shoe 12, leads 41 and 42, the moving contact 43, the fixed contact 44, leads 45 and 24, to the motor. The other side of the circuit is from the shoe 14, the leads 40 and 46, the moving contact 47, the fixed contact 48, leads 49 and 26, thus completing the circuit through the motor.

If the automobile is then steered so that the shoes 11 and 13 again contact with any pair of conductors, which must be of opposite polarity, the switch is again thrown in the following manner. Presuming the current passes through the shoe 13, the leads 19 and 50, to the contact 51 on the arm 18, the spring contact 52, the winding 53 of the electromagnet 54, and by the return lead 55 to the shoe 11, thus momentarily energizing the electromagnet 54, swinging the arms thereof to re-establish the circuit through the contacts 21, 22, 29 and 30, and breaking the opposite contacts. The walking beam switch is arranged by a toggle type of spring or other device so that the electromagnets are only required to give the initial throw or movement and this is continued by the spring and the walking beam arms held in the desired position by the spring. It will be noted that as soon as the walking beam switch is moved to establish the circuit on one side, it automatically breaks the circuit through the electromagnet, thereby reducing the consumption of current through such magnets.

The mechanical construction of the switch is substantially as follows, having reference particularly to Figs. 4, 5 and 6.

In these figures a suitable framework is illustrated supporting the electromagnets 38 and 54 and in which the walking beam switch 15 is oscillatably mounted on a pivot pin 16 so that the opposite arms 17 extend in a horizontal direction and the arm 18 depends downwardly. The lower end of the arm 18 is engaged by a toggle spring 56 so that the arm will be swung into opposite directions, after momentarily energizing either of the magnets, and held in such position. In Fig. 4 the moving contacts 21 and 30 are indicated on one side and the moving contacts 43 and 47 on the other side of the walking beam. These are shown as being formed on spring arms which have carbon contact elements 57, which are adapted to engage with similar elements held in the fixed contacts 22 and 29. It is presumed in Fig. 5 that the fixed contacts 22 and 44 are visible and that the fixed contacts 29 and 48 are immediately back of those illustrated. These contacts are also on a resilient arm 58 and these arms have a bowed contact element 59 to engage with a contact plate 60 on the spring arm 61. The spring contacts 52 and 36 are illustrated by the spring structure of Fig. 5, the wiring, however, is omitted for the sake of clarifying said drawings.

In the operation of the walking beam switch the arms 17 have the electrical features insulated and have a suitable armature, which may be attracted by the energizing electromagnets. The spring 61 is bent into such a position that when a contact is made the carbon elements 57 engage before the contacts 59 and 60. However, when the switch is open the contacts 59 and 60 break first and the contacts between the carbons 57 subsequently. Therefore this construction of the two sets of contacts for the same electric circuit eliminates sparking in the making and breaking of the current. It is to be understood that the switch may be mounted in any suitable position in the automobile or other vehicle.

A suitable type of vehicle is illustrated in Figs. 7, 8 and 9, in which the contact shoes 11, 12, 13 and 14, are indicated as being supported from a suitable bracket 65 depending from the frame 66 of the vehicle. The electric motor 25 is preferably mounted on a frame back of the rear axle. The walking beam type of switch is indicated as being mounted back of the seat and the circuit breaker 28 is indicated as of a centrifugal type actuated from the motor shaft 67. The motor, by means of a belt 68 or sprocket chain which is actuated from the shaft 67, drives a counter shaft 69 by means of a suitable pulley or sprocket 70, and from the counter shaft a chain or sprocket drive 71 leads to a sprocket gear 72 directly connected to one of the wheels 73. The vehicle is driven by one wheel, thus eliminating the use of a differential.

The automobile has front steering wheels 74 actuated by the steering wheel 75, and is protected by side bumpers 76 over the front wheels, a front bumper 77, a rear bumper 78 which has side extensions 79 surrounding the rear wheels and extending along the side of the vehicle to a position adjacent the bumpers 76. Thus protected, the automobiles may collide without injury to the vehicles or the occupants and as they can never travel at high speed there is but little danger of accident.

From the above description of my invention, together with the drawings, it will be seen that I have developed an automobile riding amusement device in which the track system is provided with a series of conductors embedded in the surface of the track, adjacent conductors being of different polarity. The current is fed to such conductors by a control device so that the voltage of different conductors may be changed either manually or by a mechanical construction. The current is also fed to the conductors at different positions around the track to prevent too great a drop in voltage, and hence current, should a majority of the vehicles be massed on one side.

The automobiles themselves have contact shoes positioned so that a feed and return circuit is substantially always established between a pair of such shoes and a pair of the adjacent conductors, provided the vehicle is running in a straight line on the tangent parts of the track or following a turn on the curve conforming to that of the conductors. The operator of the vehicle, as above mentioned, can merely control the steering but not the amount of current his vehicle is receiving and, as he does not know which conductors have the greatest energy, he may travel from one side of the track to the other until he picks up the conductor which will give him the greatest speed or the slowest speed, as desired. The automobiles colliding in traveling around the track adds zest to the enjoyment of the amusement and the patrons may either travel leisurely or have racing contests one with the other, in which the uncertainty of the rate of travel adds considerably to the amusement.

The spring contacts 36 and 52 maintain their engagement with the moving contacts 35 and 51 until the arm has swung past the dead center and then the toggle spring 56 completes the rest of the movement. It is also to be noted that it is not necessary that the conductors on the track be flush with the surface of the track as these can be made of comparatively thin metal and merely made on the track surface.

Various changes may be made in the principles of my invention without departing from the spirit thereof, as set forth in the description, drawings and claims:

I claim:

1. An automobile riding device comprising in combination, a track having a series of conductors spaced laterally equal distances apart, the conductors alternating in polarity, a vehicle having a plurality of pairs of contact shoes, the shoes being equally spaced, an electric motor, a circuit between a pair of conductors through a pair of the shoes to the motor, and an electromagnetic device momentarily energized to make and break the motor circuit.

2. An automobile riding device, as claimed in claim 1, means to vary the potential of certain conductors in reference to others.

3. An automobile riding device, as claimed in claim 1, the track being continuous and having means to feed the current to the conductors at a plurality of different positions, and means to vary the potential of certain conductors in reference to others.

4. An automobile riding device having a continuous track with a series of lateral equally spaced conductors of alternating polarity, means to vary the potential of certain conductors in reference to others, a vehicle having a plurality of pairs of equally spaced contact shoes, an electric motor to operate the vehicle, an electromagnetic switch operating device momentarily energized, and a motor circuit between a pair of said shoes and the motor controlled by said switch.

5. An automobile riding device, as claimed in claim 4, having a speed actuated make and break device in the motor circuit actuated by the motor to break the circuit on too great a speed of the motor.

6. In an automobile riding device a vehicle having a plurality of pairs of contact shoes, an electric motor, a circuit between each pair of shoes and the motor, and an electromagnetic make and break device momentarily energized to control the motor circuit.

7. An automobile riding device having a vehicle with a plurality of pairs of contact shoes, an electric motor to drive the vehicle, a plurality of electromagnets, a circuit from some of the shoes to the magnets having a make and break contact therein, a moving device actuated by the magnets to make and break the magnet circuits, and means controlled by said device to make and break the motor circuits.

8. In an automobile riding device a vehicle having a plurality of pairs of contact shoes, a plurality of electromagnets, a moving device having a pair of opposite arms and a depending arm, a circuit from each pair of shoes to a magnet having a make and break switch with one element on the depending arm, a magnet when energized operating said device to swing the arms and to make one circuit and break the circuit energized, and a plurality of contacts actuated by said arms to make and break the motor circuits.

9. An automobile riding device comprising in combination, a continuous track having a series of conductors spaced laterally, the conductors being of alternate polarity, means to feed the current to the conductors at different positions around the track, means to vary the potential of different conductors in reference to others, a vehicle having an electric motor to drive same, a circuit between a pair of conductors and the motor, the vehicle having a plurality of contact shoes, an electromagnetically operated switch having a plurality of electromagnetic devices energized momentarily to make and break the motor circuit.

In testimony whereof I have signed my name to this specification.

FRANK S. RICH.